Patented Nov. 19, 1940

2,222,385

UNITED STATES PATENT OFFICE 2,222,385

MANUFACTURE OF CALCIUM SULPHATE

Willis F. Washburn, Metuchen Township, Middlesex County, N. J., and Franklin L. Kingsbury, St. Louis, Mo., assignors, by mesne assignments, to National Lead Company, New York, N. Y., a corporation of New Jersey No Drawing. Application February 6, 1935, Serial No. 5,317. In Germany August 1, 1931

12 Claims. (Cl. 23—122)

This application is a continuation in part of our co-pending application, Serial No. 475,385, filed August 14, 1930, which discloses a method for the manufacture of titanium pigments.

In this co-pending Serial No. 475,385 there is disclosed in the specification and examples given to illustrate the process claimed therein, a method for artificially preparing calcium sulphate possessing the crystalline structure of the anhydrite.

The present invention relates specifically to the preparation of calcium sulphate having the crystalline structure of the anhydrite, the object of the invention being to provide methods for artificially producing anhydrite calcium sulphate of such particle size, texture, color, and other chemical and physical properties as to render it especially adapted for varied uses in the industrial arts.

Previous to our invention calcium sulphate having the crystalline structure of the anhydrite has been recognized as one of the naturally occurring forms of calcium sulphate. We are, however, not aware of any methods prior to our invention for preparing this material artificially except those which are based upon the removal of water from hydrated forms of calcium sulphate. Roscoe and Schorlemmer in their "Treatise on Chemistry" 6th ed., 1923, vol. II, p. 569 state that one form of anhydrous calcium sulphate, resembling natural anhydrite, may be prepared by heating gypsum strongly while another form, known as soluble anhydrite, may be obtained by completely dehydrating gypsum at 60°–90° in a vacuum over phosphoric oxide. The changes which occur in the transition from one form to the other are said to occur at a slow rate. Thorpe's "Dictionary of Applied Chemistry," Supplement vol. I, 1934, p. 203, gives temperatures (196° C.) at which the calcium sulphate dihydrate, gypsum, ($CaSO_4.2H_2O$), is converted to the soluble anhydrite without alteration in crystalline structure. This soluble form, it is stated, is converted into small crystals optically identical with natural anhydrite by heating at a red heat. Ullman's "Enzyklopädie der technischen Chemie" vol. III, 1916, p. 233 also discusses the preparation of anhydrous calcium sulphate from the hydrated forms. Van't Hoff et al., Zeit. physikal Chemie, 1903, 45 p. 257 and Mellor "A Comprehensive Treatise on Inorganic and Theoretical Chemistry," vol. III, 1927, p. 763 et seq. are also of interest. These references are typical of the literature relating to the preparations of anhydrous calcium sulphate having a crystalline structure of the anhydrite, and none of them anticipate the nature of the present invention.

It is, of course, well-established that by reacting a suitable compound of calcium with sulphuric acid one form of calcium sulphate will be produced. This known reaction always yields a hydrated form of calcium sulphate, for the most part $CaSO_4.2H_2O$ having the crystalline structure of gypsum. As will be noted from the references cited above this gypsum may be dehydrated by heating to 196° C. yielding an anhydrous form of calcium sulphate, known as "soluble anhydrite" but as pointed out in Thorpe's "Dictionary of Applied Chemistry," supra, no alteration in crystalline structure is involved. Such soluble anhydrite is sometimes referred to as pseudomorphic after the original gypsum.

We have now discovered that a calcium sulphate having the crystalline structure of the anhydrite may be artificially prepared by reacting a suitable compound of calcium with relatively concentrated sulphuric acid under carefully controlled conditions. By the term "crystalline structure" as used in this description of our invention and in the claims appended hereto we refer primarily to the external crystalline structure, i. e., external form of the crystal, as distinguished from the internal crystalline structure, i. e., internal crystal lattice.

Among the factors and conditions which we have observed as exerting an influence upon the formation of the anhydrite and which consequently must be controlled are the following:

1. Concentration of calcium compound in solution or suspension.
2. Specific gravity of the sulphuric acid.
3. Initial temperature of the reactants.
4. Temperature developed by the reaction.
5. Relative proportions of sulphuric acid to calcium compound in the reaction mixture.
6. Rate of admixture of the reactants.

These factors and conditions may be varied within certain limits but inasmuch as a variation in one usually requires a compensating variations in others it would be impossible here to enumerate all the possible variations which, without departing from the scope of our invention, would still produce anhydrite. Our researches, however, have led us to certain fundamental considerations regarding the determination of proper conditions for anhydrite formation which serve as guides in the practice of our invention. These observations may be summarized broadly as follows:

1. The relative concentrations of calcium compound and sulphuric acid should be such that there be present during the reaction, at least a sufficient amount of sulphuric acid to react with all the calcium compound added. We have at times found it desirable to have an excess of sulphuric acid present which may be found in the mother-liquid after formation of the anhydrite.

2. The temperature of reaction should be such that the nascent calcium sulphate will not take on water of hydration. Such temperature we have determined to be above about 70° C. Since the reaction is apparently exothermic and additional heat is liberated by dilution of the concentrated acid, it may not be necessary in all cases to supply heat from external sources.

3. The admixture of calcium compound and sulphuric acid should be carried out in such manner that the anhydrite forms in an acid medium.

From the above three primary considerations practically all variations possible may be deduced. Thus, if a relatively dilute solution or suspension of calcium compound be employed it will follow that since the quantity of water present is greater a larger amount of sulphuric acid must be employed to yield a low concentration of acid in the mother-liquor if the conditions be such as to require an excess of acid. Also, since there is a large volume of material to dissipate the heat of reaction and dilution, it may be necessary to increase the rate of admixture, the initial temperature of reactants, and amount of externally supplied heat, either singly or collectively. Again, if a larger quantity of sulphuric acid or relatively more concentrated acid is employed, the quantity of water in the solution or suspension of calcium compound may be raised, the rate of admixture decreased, the initial temperature of the reactants lowered, and the amount of externally supplied heat diminished without adversely affecting the formation of the anhydrite. The converse of these statements are, of course, also true. The control of the various factors and conditions of our invention will be specifically illustrated in the examples included in this description.

Regarding the choice of calcium compound to be employed in the preparation of the anhydrite according to our invention, a soluble compound in aqueous solution or a relatively insoluble compound in aqueous suspension, i. e. in the form of what is sometimes referred to as a "slurry" will serve. However, practical considerations will determine the choice of the most suitable compound. For example, it is much more economical to employ a slurry of calcium hydrate than to use a solution of the expensive soluble calcium chloride. Among the water-insoluble calcium compounds which we have found well suited to the practice of our invention may be mentioned: finely divided calcium oxide, hydroxide or carbonate.

Bearing the foregoing discussion in mind, we can now specifically illustrate our invention by means of examples which are, however, not to be construed as imposing limitations thereto.

*Example 1.*—25 lbs. of hydrated lime ($Ca(OH)_2$) in 32 gallons of water at 20° C. are rapidly added with agitation to 204.5 lbs. of 78% sulphuric acid in a suitable reaction vessel, also at 20° C.

The lime slurry used contains approximately one part $Ca(OH)_2$ to 10.5 parts $H_2O$ and may be regarded as being relatively dilute. Since 25 lbs. of $Ca(OH)_2$ would theoretically require about 42.5 lbs. of 78% $H_2SO_4$ to form anhydrite $CaSO_4$, there is an excess present of approximately 160 lbs. of 78% $H_2SO_4$. This excess is required to furnish adequate heat of dilution and reaction and to form a mother-liquor of proper acid content. The combined weight of water present being approximately 325 lbs. (44.5 lbs. from the 78% $H_2SO_4$; 12.5 formed in the reaction, and 268 present in the lime slurry) the acid content of the mother-liquor is between 25–30%.

In practicing the invention according to the foregoing example if the heat developed from the reaction and from dilution of the acid is not sufficient to maintain the temperature over 100° C., preferably 110°–115° C., external heat should be supplied.

*Example 2.*—As illustrative of the reduction in acid permitted by raising the initial temperature of the reactants, the following example is typical.

A lime slurry similar to that of Example 1, i. e. containing 25 lbs. $Ca(OH)_2$ and 32 gallons $H_2O$, is heated to 70° C. This elevation in temperature permits the use of but 122 lbs. 78% $H_2SO_4$. However, in this case, since less water is added as 78% acid the acid concentration of the mother-liquor will be approximately 20–25%.

*Example 3.*—This example is illustrative of the preparation of the anhydrite from a relatively concentrated lime slurry and using only a sufficient quantity of acid to give an acid content in the mother-liquor of 15%.

A lime slurry containing 10 lbs. $Ca(OH)_2$ and about 8.5 gallons of water (approximately a 1–7 slurry) is heated to 70° C. and added rapidly with agitation to about 35.0 lbs. of 78% $H_2SO_4$. The rise in temperature is rapid and ordinarily no external heat is required. The mother-liquor will contain approximately 15% sulphuric acid.

It will be understood that in these examples an equivalent quantity of quick lime might have been used in place of the hydrated lime.

The precipitated anhydrite which results from the above examples is separated from the mother-liquor, in any convenient manner, as by decantation, filtration, etc., washed free of acid, and dried.

The calcium sulphate so obtained is easily identified as is also similar calcium sulphate obtained by other possible variations of our invention. Subjected to crystallographic examination with microscope or X-ray it shows the structure of the anhydrite. Upon ignition it undergoes no substantial loss in weight. The dry material is not appreciably hygroscopic and as such it does not readily take up water of hydration. However, when not completely dry, or when suspended in water as an aqueous slurry, it does readily take on water of hydration and is transformed to an hydrated product. It exhibits marked solubility in water; in this respect resembling the "soluble anhydrite," referred to by Thorpe, supra, from which it differs in crystalline structure. It is white in color, smooth in texture and very finely divided.

We have found that the particle size of our novel anhydrite can be influenced by variation in certain conditions of the reaction. For example, higher concentration of acid, higher reaction temperature, more rapid completion of the reaction, higher concentration of reactants and more vigorous agitation tend to yield a precipitate of finer particle size. By proper adjustment of these factors particles varying in size from a fraction of a micron to 2 microns or more may be obtained.

In order to stabilize our novel anhydrite it is desirable to subject the dry precipitated product to a calcination. We have found that by calcination at a temperature between 550°–750° C. the unstable anhydrite is rendered stable against the action of liquid water. As a result of such a calcination, our novel products lose their solubility in water and will no longer be converted to hydrated compounds in aqueous mediums.

The products obtained by the foregoing examples have the following particle size characteristics as determined by the method suggested by E. J. Dunn, Jr., Industrial and Engineering Chemistry, Analytic edition, volume 2, page 59, January 15, 1930:

They are substantially free from particles having a diameter above 1.5 microns and about 85 per cent of the weight of the whole is made up of particles having a diameter between about ¼ micron and about 1 micron. Generally, however, the products will be somewhat finer. For instance, in one such calcined product prepared according to Example 1 above, nearly 100 per cent of the weight of all the particles had a diameter at and below 1.0 micron and over 90 per cent had a diameter at and below 0.75 micron.

Both our novel unstable anhydrite and the calcined product are adapted for many industrial purposes. The calcined product may advantageously be used as a paint pigment or extender, a rubber filler or base for lake pigments. It may, in fact, be used wherever previously known forms of calcium sulphate are demanded. The unstable form, either before or after drying, is particularly well adapted for the manufacture of composite titanium pigments either by coprecipitation or otherwise.

We claim:

1. The process of making calcium sulphate which under X-ray and microscopic examination shows the crystalline structure of anhydrite, which comprises adding an aqueous suspension of a compound of calcium selected from the group consisting of calcium oxide, calcium hydroxide, calcium carbonate, to an amount of strong sulphuric acid in excess of that required to react with all the calcium, under such conditions that a temperature above 70° C. will result from the combined heats of reaction and dilution of the acid and free sulphuric acid will be found in the mother-liquor upon completion of the reaction, and then separating the resulting uniform finely-divided anhydrite from the mother-liquor.

2. The process as described in claim 1, in which the sulphuric acid employed is over 70% in strength.

3. The process of making a calcium sulphate which under X-ray and microscopic examination shows the crystalline structure of anhydrite, which comprises mixing an aqueous suspension of a compound of calcium selected from the group consisting of calcium oxide, calcium hydroxide, calcium cabonate, with an excess of strong sulphuric acid, and maintaining the mixture at a temperature above 70° C. and within limits of concentration such that free sulphuric acid will be found in the mother-liquor upon completion of the reaction to form anhydrite as the final reaction product, and then separating the resulting uniform finely-divided anhydrite from the mother-liquor.

4. The process as described in claim 3, in which the sulphuric acid is over 70% in strength.

5. The process of making calcium sulphate which under X-ray and microscopic examination shows the crystalline structure of anhydrite, which comprises mixing an aqueous suspension of a compound of calcium selected from the group consisting of calcium oxide, calcium hydroxide, calcium carbonate, with an excess of strong sulphuric acid in such proportions that a temperature above 70° C. will result from the combined heats of reaction and dilution of the acid, and free sulphuric acid will be found in the mother-liquor upon completion of the reaction, and maintaining the conditions of temperature and concentration to form substantially pure anhydrite as the reaction product, separating, washing, drying and calcining the said anhydrite until it is substantially insoluble in water and exhibits no tendency to form hydrated compounds in contact with water.

6. The process of making calcium sulphate which under X-ray and microscopic examination shows the crystalline structure of anhydrite, which comprises adding an aqueous slurry of calcium hydroxide to a sulphuric acid of over 70% strength while maintaining the temperature of the reaction mixture above about 70° C., at least 35% of said acid being in excess of that required to form calcium sulphate, and then separating the resulting uniform finely-divided anhydrite from the mother liquor.

7. The process of making calcium sulphate which under X-ray and microscopic examination shows the crystalline structure of anhydrite, which comprises adding an aqueous slurry of a compound of calcium selected from the group consisting of calcium oxide, calcium hydroxide, calcium carbonate, to a sulphuric acid of over 78% strength while maintaining the temperature of the reaction mixture above about 70° C., at least 35% of said acid being in excess of that required to form calcium sulphate, and then separating the resulting uniform finely-divided anhydrite from the mother-liquor.

8. Process of preparing calcium sulphate which under X-ray and microscopic examination shows the crystalline structure of anhydrite, which comprises adding to sulphuric acid an aqueous suspension of a calcium compound of the group consisting of calcium oxide, to calcium hydroxide and calcium carbonate, the two being mixed in such relative proportions that there is present during the reaction at least a sufficient amount of sulphuric acid to react with all of the calcium compound present, the temperature of the reaction being such that anhydrite is formed and will not take on any substantial amount of water of hydration, and then separating the anhydrite.

9. Process of preparing calcium sulphate which under X-ray and microscopic examination shows the crystalline structure of anhydrite, which comprises adding to sulphuric acid a calcium compound of the group consisting of calcium oxide, calcium hydroxide and calcium carbonate, the two being mixed in such relative proportions that there is present during the reaction at least a sufficient amount of sulphuric acid to react with all of the calcium compound present, the temperature of the reaction being such that anhydrite is formed and will not take on any substantial amount of water of hydration, and then separating the anhydrite.

10. Process of preparing calcium sulphate which under X-ray and microscopic examination shows the crystalline structure of anhydrite, which comprises adding to sulphuric acid an aqueous suspension of a calcium compound of the group consisting of calcium oxide, calcium hydroxide and calcium carbonate, the two being mixed in such relative proportions that there is present during the reaction at least a sufficient amount of sulphuric acid to react with all of the calcium compound present, the temperature of the reaction mixture being maintained above about 70° C., and then separating the anhydrite.

11. Process of preparing calcium sulphate which under X-ray and microscopic examination shows the crystalline structure of anhydrite, which comprises adding to sulphuric acid an aqueous suspension of a calcium compound, other than the phosphate, capable of reacting with sulphuric acid to form calcium sulphate, the two being mixed in such relative proportions that there is present during the reaction at least a sufficient amount of sulphuric acid to react with all of the calcium compound present, the temperature of the reaction mixture being maintained above about 70° C., and then separating the anhydrite.

12. As a new product, a calcined, precipitated, uniformly finely divided, white insoluble anhydrite showing the crystalline structure of anhydrite under X-ray and microscopic examination, about 85% by weight of the particles in said product having diameters in the range between about ¼ micron and about 1 micron and said product being substantially free from particles of a diameter above 1.5 microns.

WILLIS F. WASHBURN.
FRANKLIN L. KINGSBURY.